(12) United States Patent
Wang et al.

(10) Patent No.: US 10,237,475 B2
(45) Date of Patent: Mar. 19, 2019

(54) CAMERA MODULE

(71) Applicant: ASIA VITAL COMPONENTS CO., LTD., New Taipei (TW)

(72) Inventors: Wei-Chuan Wang, New Taipei (TW); Jing-Xia Pei, New Taipei (CN); Huan Deng, New Taipei (CN)

(73) Assignee: Asia Vital Components Co., Ltd., New Taipei (TW)

( * ) Notice: Subject to any disclaimer, the term of this patent is extended or adjusted under 35 U.S.C. 154(b) by 48 days.

(21) Appl. No.: 15/406,771

(22) Filed: Jan. 15, 2017

(65) Prior Publication Data

US 2018/0205883 A1 Jul. 19, 2018

(51) Int. Cl.
| | |
|---|---|
| *G02B 13/06* | (2006.01) |
| *H04N 5/00* | (2011.01) |
| *G03B 37/00* | (2006.01) |
| *H04N 5/232* | (2006.01) |
| *H04N 5/225* | (2006.01) |
| *G03B 11/00* | (2006.01) |
| *G02B 15/14* | (2006.01) |

(52) U.S. Cl.
CPC ......... *H04N 5/23238* (2013.01); *G02B 13/06* (2013.01); *G03B 11/00* (2013.01); *G03B 37/00* (2013.01); *H04N 5/2254* (2013.01); *H04N 5/2258* (2013.01); *G02B 15/14* (2013.01)

(58) Field of Classification Search
CPC ..... G02B 13/08; H04N 5/23238; G03B 37/00
USPC ......................................................... 348/38
See application file for complete search history.

(56) References Cited

U.S. PATENT DOCUMENTS

| | | | | |
|---|---|---|---|---|
| 2005/0001905 | A1* | 1/2005 | Shinomiya | H04N 5/2251 348/207.99 |
| 2009/0295949 | A1* | 12/2009 | Ojala | G02B 3/0018 348/240.99 |
| 2011/0175987 | A1* | 7/2011 | Hoffmeier | H04N 13/239 348/47 |
| 2013/0069188 | A1* | 3/2013 | Chen | H01L 27/14605 257/432 |
| 2014/0270707 | A1* | 9/2014 | Fathi | G11B 27/031 386/278 |
| 2015/0373266 | A1 | 12/2015 | Hsieh et al. | |

FOREIGN PATENT DOCUMENTS

| | | |
|---|---|---|
| CN | 105472226 A | 4/2016 |
| CN | 105592767 A | 5/2016 |
| CN | 205450424 U | 8/2016 |
| TW | M533238 U | 12/2016 |

* cited by examiner

*Primary Examiner* — Jeffery A Williams
(74) *Attorney, Agent, or Firm* — C. G. Mersereau; DeWitt LLP

(57) ABSTRACT

A camera module includes a first and a second photographing member, and a circuit substrate. The circuit substrate has a first lateral side and an opposite second lateral side, and a plurality of circuits. The first and the second photographing member is provided on the first and the second lateral side of the circuit substrate respectively and electrically connected to the circuit substrate. With these arrangements, the camera module can have overall reduced volume and is able to photographing a 360-degree panoramic image and lower the manufacturing cost.

7 Claims, 5 Drawing Sheets

CAMERA MODULE

FIELD OF THE INVENTION

The present invention relates to a camera module, and more specifically, to a camera module which can integrate two or more camera lenses into one circuit substrate and provide 360-degree panoramic photographing capability.

BACKGROUND OF THE INVENTION

Conventionally, a camera is normally equipped with one lens. A wide-angle lens has a visual angle between 64- to 76-degree, whereas an extra-wide-angle lens has a visual angle between 84- to 110-degree. As the advancement of optical lens and chip technology, normal camera modules with conventional visual system cannot meet consumers' demands. Nowadays, wide-angle imaging has a distinctive characteristic of ultra visual field and thus become a hot issue and gets a great deal of attention in contemporary visual studies.

Now a surrounding 360-degree panoramic image centering around a photographing point made of a plurality of photographed image performs a step of combining the plurality of the photographed image to generate a surrounding 360-degree or more panoramic image centering around the photographing point with the aids of software or apps. Recently, with the development of optical imaging technology, more and more portable devices, such as camera devices have become increasingly popular for users and traditional camera devices with panoramic photographing capability composed of multi-lenses are bulky and heavy and can hardly be miniaturized. Further, the limited space on camera devices can affect the way in which these images are displayed to a user, which can impact the ability of a user to view and/or locate images such as panoramic images. It is therefore tried by the inventor to develop an improved camera module to overcome the drawbacks and problems in the conventional camera module.

Conventionally, a panoramic camera device is equipped with two or three impendent lenses, each of which photographs image data between 120-degree visual angle thereof. Also, image data obtained by photographing the plurality number of times are combined to generate a 360-degree panoramic image data (annular image data). Further, the two or three impendent lenses and camera elements are assembled before they are combined into a 36-degree panoramic camera module, which is bulky and heavy and can hardly be portable. It is therefore tried by the inventor to develop an improved camera module to overcome the drawbacks and problems in the conventional camera module.

SUMMARY OF THE INVENTION

To solve the above problems, a primary object of the present invention is to provide a camera module that has a miniature volume and is capable of photographing a 360-degree panoramic image.

To achieve the above and other objects, the camera module according to the present invention includes a first and a second photographing member, and a circuit substrate.

The first photographing member has at least one first lens, a first filter, and at least one first image processing chip, which are arranged in sequence, whereas the second photographing member has at least one second lens, a second filter, and at least one second image processing chip, which are arranged in sequence as well. Both the first and the second lenses are extra-wide-angle and each has a visual angle wider than 140-degree.

The circuit substrate has a first and an opposite second lateral side disposed on two sides thereof, and a plurality of circuits. The first and the second photographing member is provided on the first and the second lateral side of the circuit substrate respectively and electrically connected to the circuit substrate. The circuit substrate is a multilayer circuit substrate.

With these arrangements, the camera module not only can have overall reduced volume to more easily portable but also can provide 360-degree panoramic photographing.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
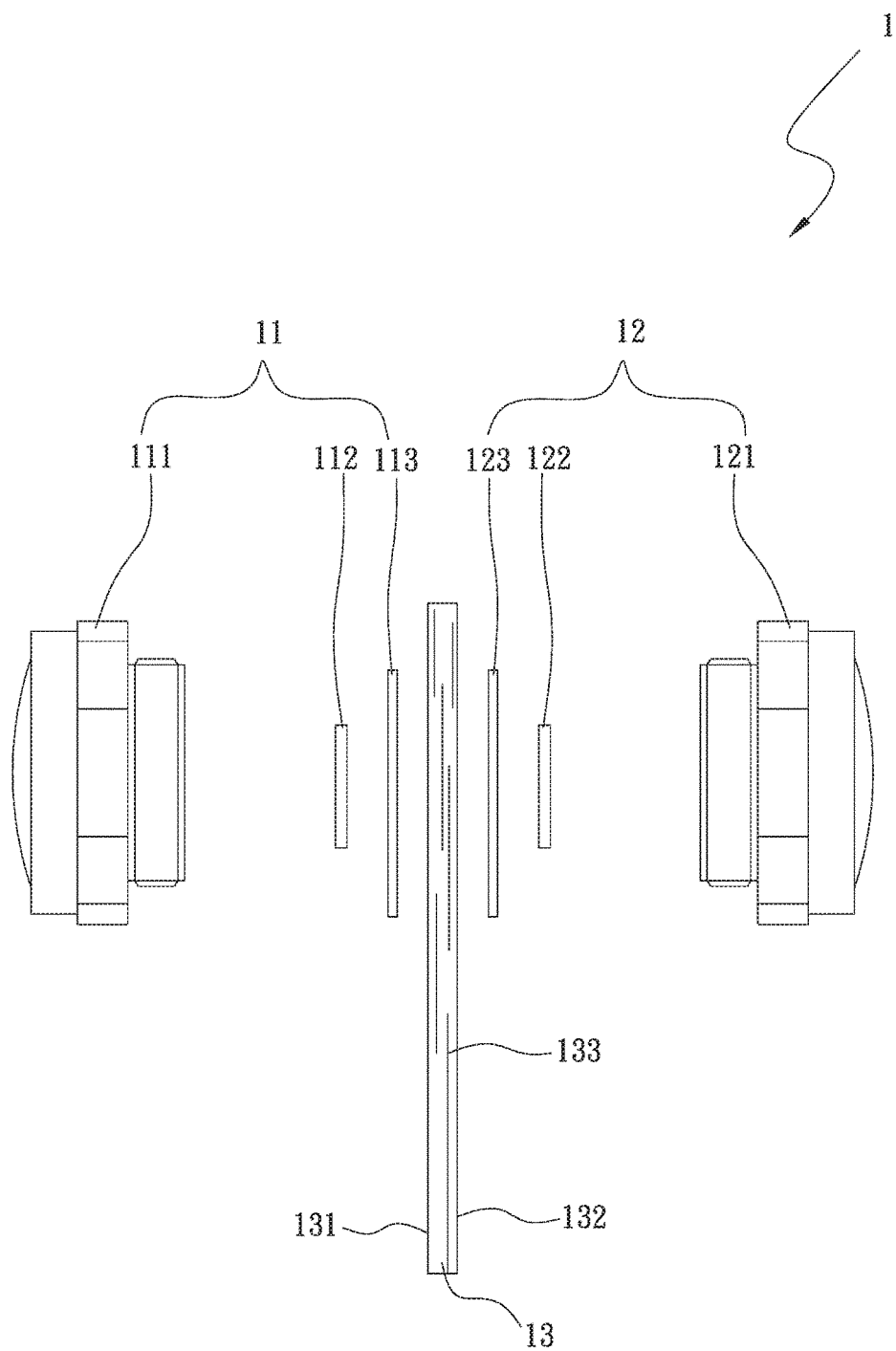
FIG. 1 is an exploded perspective view of a camera module according to a first preferred embodiment of the present invention.

The present invention will now be described with some preferred embodiments thereof and by referring to the accompanying drawings. For the purpose of easy to understand, elements that are the same in the preferred embodiments are denoted by the same reference numerals.

Figure 2:
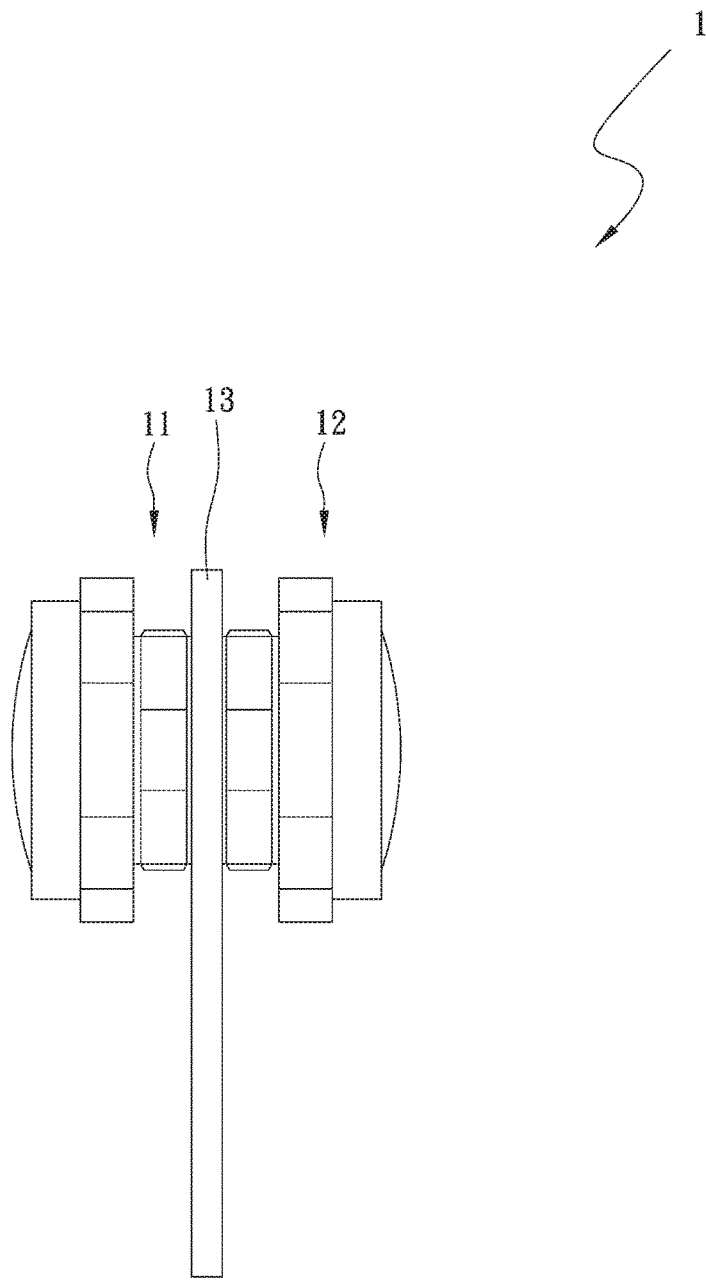
FIG. 2 is an assembled perspective view of FIG. 1.

Please refer to FIGS. 1 and 2, which are exploded and assembled perspective views, respectively, of a camera module 1 according to a first preferred embodiment of the present invention. As shown, the camera module 1 includes a first and a second photographing member 11, 12, and a circuit substrate 13.

The first photographing member 11 has at least one first lens 111, a first filter 112, and at least one first image processing chip 113, which are arranged in sequence, whereas the second photographing member 12 has at least one second lens 121, a second filter 122, and at least one second image processing chip 123, which are arranged in sequence as well. Both the first and the second lenses 111, 121 are extra-wide-angle and each has a visual angle wider than 140-degree.

The circuit substrate 13 has a first and an opposite second lateral side 131, 132, and a plurality of circuits 133. The first and the second photographing member 11, 12 is provided on the first and the second lateral side 131, 132 of the circuit substrate 13 respectively and electrically connected to the circuit substrate 13. The circuit substrate 13 is a multilayer circuit substrate.

Figure 3:
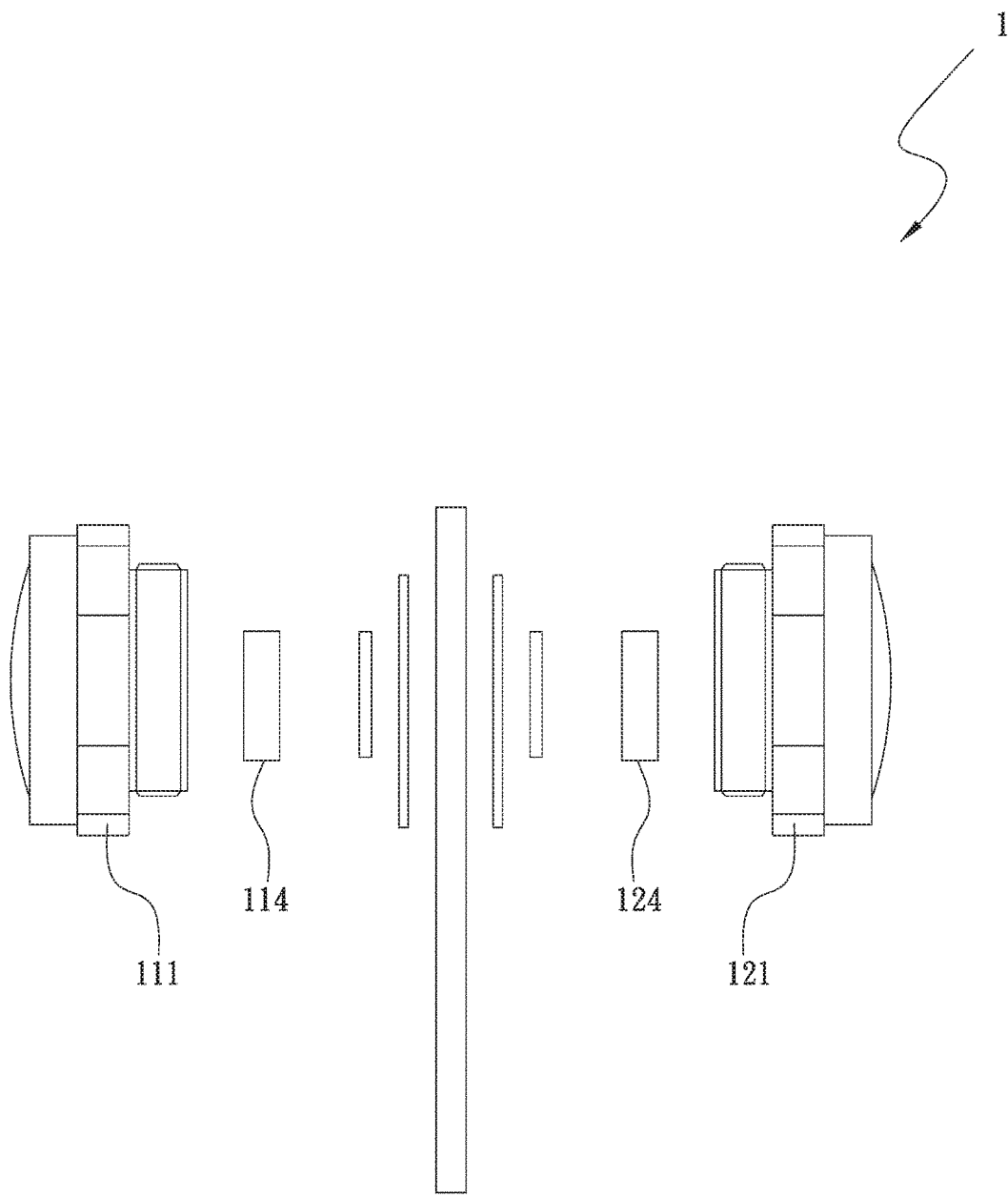
FIG. 3 is an exploded perspective view of the camera module according to a second preferred embodiment of the present invention.

Please refer to FIG. 3, which is an exploded perspective view of the camera module 1 according to a second preferred embodiment of the present invention. As shown, the second embodiment of the camera module 1 is generally structurally similar to the first embodiment except that, in this second embodiment, the camera module 1 further includes a third and a fourth lens 114, 124, wherein the third lens 114 is located correspondingly to the first lens 111 both of which can together provide optical zoom capability, whereas the fourth lens 124 is located correspondingly to the second lens 121 both of which can together provide optical zoom capability.

Figure 4:
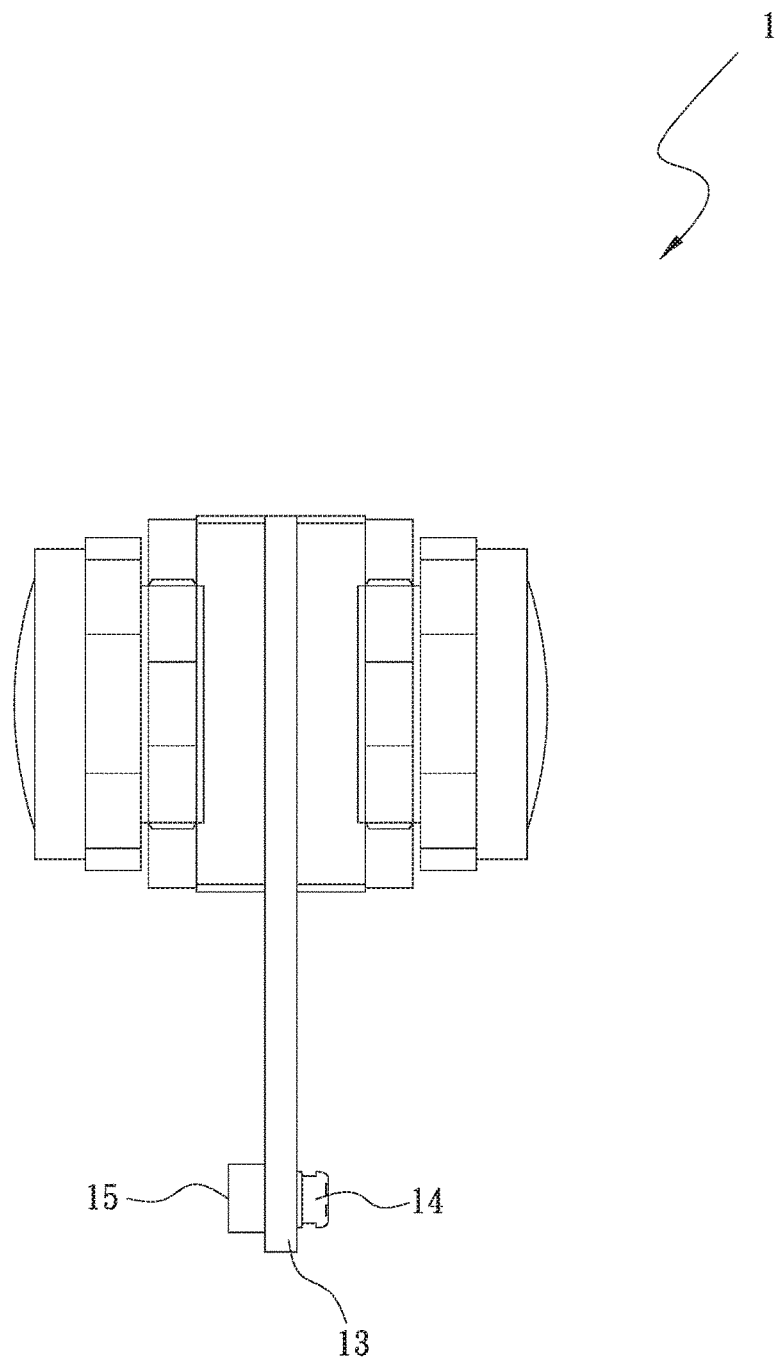
FIG. 4 is an assembled perspective view of the camera module according to a third preferred embodiment of the present invention.

Please refer to FIG. 4, which is an assembled perspective view of the camera module 1 according to a third preferred embodiment of the present invention. As shown, the third embodiment of the camera module 1 is generally structurally similar to the first embodiment except that, in this third embodiment, the camera module 1 further includes a male and a female connector fitting 14, 15, which is electrically connected to the circuit substrate 13 respectively.

Figure 5:
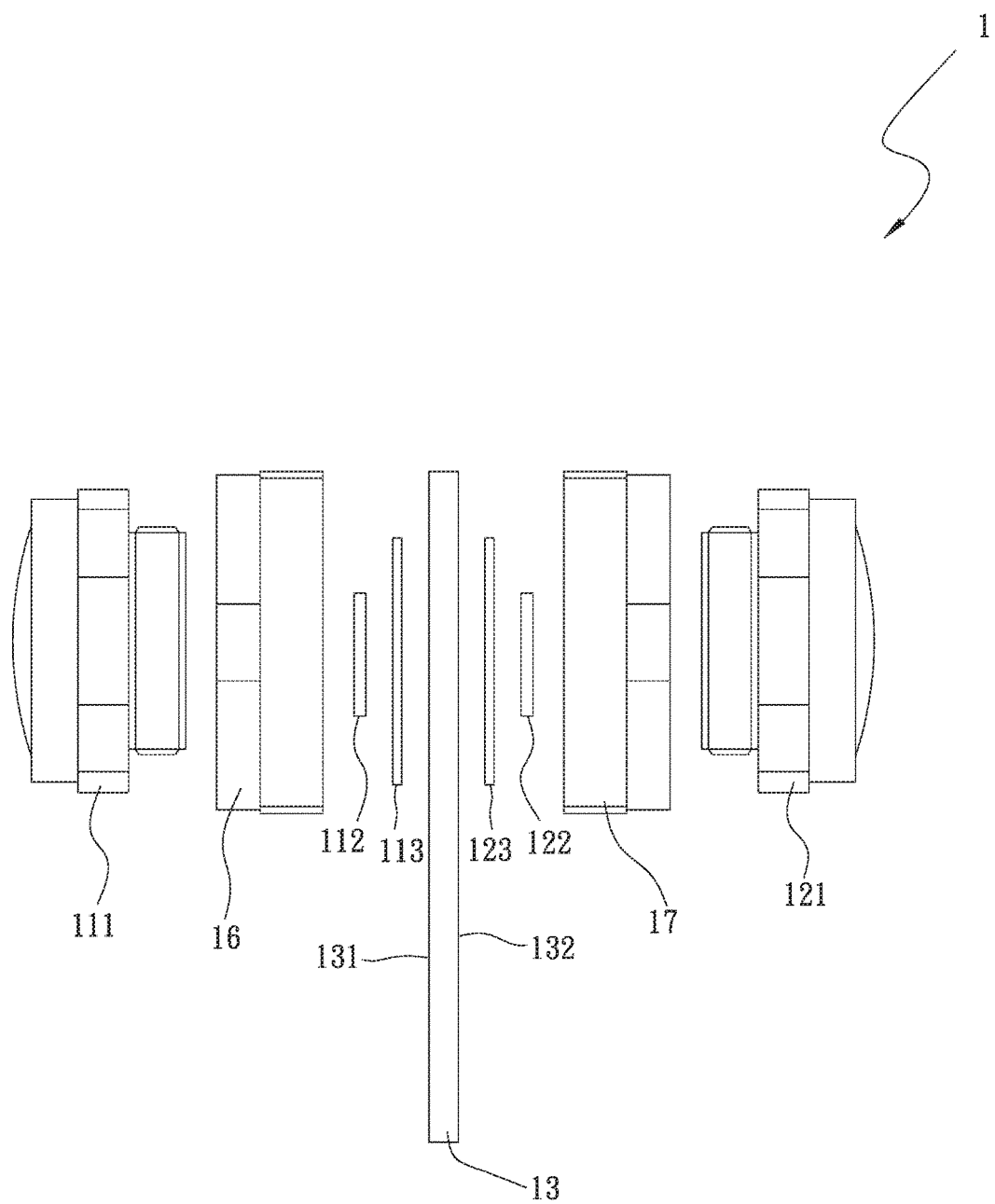
FIG. 5 is an exploded perspective view of the camera module according to a fourth preferred embodiment of the present invention.

Please refer to FIG. 5, which is an exploded perspective view of the camera module 1 according to a fourth preferred embodiment of the present invention. As shown, the fourth embodiment of the camera module 1 is generally structurally similar to the first embodiment except that, in this fourth embodiment, the camera module 1 further includes a first and a second lens base 16, 17. The first lens base 16 is located on the first lateral side 131 and correspondingly attached to the first photographing member 11, wherein the first lens 111 is mately attached to one side of the first lens base 16, and the first filter 112 and the first image processing chip 113 is secured into the opposite side of the first lens base 16.

The second lens base 17 is located on the second lateral side 132 and correspondingly attached to the second photographing member 12, wherein the second lens 121 is mately attached to one side of the second lens base 17, and the second filter 122 and the second image processing chip 123 is secured into the opposite side of the second lens base 17.

With these arrangements, the camera module not only can have overall reduced volume to more easily portable for users but also can provide 360-degree panoramic photographing, as well as lower the manufacturing cost.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A camera module, comprising:
    a first photographing member having at least one first lens, a first filter, and at least one first image processing chip;
    a second photographing member having at least one second lens, a second filter, and at least one second image processing chip;
    a first lens base being correspondingly attached to the first photographing member, the first lens being attached to one side of the first lens base, the first filter and the first image processing chip being secured into an opposite side of the first lens base;
    a second lens base being correspondingly attached to the second photographing member, the second lens being attached to one side of the second lens base, the second filter and the second image processing chip being secured into an opposite side of the second lens base; and
    a circuit substrate having a first and an opposite second lateral side, and a plurality of circuits; and the first and the second photographing member being attached to the first and the second lateral side of the circuit substrate respectively and electrically connected to the circuit substrate, the first lens base being located on the first lateral side of the circuit substrate and the second lens base being located on the second lateral side.

2. The camera module as claimed in claim 1, wherein the circuit substrate is a multilayer circuit substrate.

3. The camera module as claimed in claim 1, wherein both the first and the second lenses are extra-wide-angle and each has a visual angle wider than 140-degree.

4. The camera module as claimed in claim 1, wherein further comprising a third lens located correspondingly to the first lens; the first and the third lens can together provide optical zoom capability.

5. The camera module as claimed in claim 1, wherein further comprising a fourth lens located correspondingly to the second lens; the second and the fourth lens can together provide optical zoom capability.

6. The camera module as claimed in claim 1, further comprising a male connector fitting, which being electrically connected to the circuit substrate.

7. The camera module as claimed in claim 1, further comprising a female connector fitting, which being electrically connected to the circuit substrate.

* * * * *